(12) United States Patent
Momonoi et al.

(10) Patent No.: US 8,400,579 B2
(45) Date of Patent: Mar. 19, 2013

(54) LIQUID CRYSTAL DISPLAY AND BACKLIGHT MODULE WITH TILTING REFLECTIVE SURFACE

(75) Inventors: Yoshiharu Momonoi, Yokohama (JP); Kazuyasu Ohwaki, Tokyo (JP); Kenzo Isogawa, Tokyo (JP); Takeshi Morino, Yokohama (JP); Masataka Shiratsuchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/162,468

(22) Filed: Jun. 16, 2011

(65) Prior Publication Data
US 2012/0120087 A1 May 17, 2012

(30) Foreign Application Priority Data
Nov. 16, 2010 (JP) .................................. 2010-256145

(51) Int. Cl.
*G02F 1/1335* (2006.01)
*F21V 7/04* (2006.01)

(52) U.S. Cl. ................ 349/62; 349/61; 349/65; 349/67; 349/68; 362/609; 362/611; 362/615; 362/620; 362/626

(58) Field of Classification Search ............. 349/61–68; 362/606–619, 623–625, 514, 516, 543, 560
See application file for complete search history.

(56) References Cited

U.S. PATENT DOCUMENTS

| | | | |
|---|---|---|---|
| 5,704,703 A * | 1/1998 | Yamada et al. | 362/27 |
| 6,986,600 B2 * | 1/2006 | Yamada et al. | 362/626 |
| 8,033,676 B2 * | 10/2011 | Lee et al. | 362/97.1 |
| 2009/0002602 A1 * | 1/2009 | Hsu | 349/65 |
| 2011/0037783 A1 * | 2/2011 | Hur et al. | 345/690 |

FOREIGN PATENT DOCUMENTS

| | | |
|---|---|---|
| JP | 2004-286803 | 10/2004 |
| JP | 2004-303564 | 10/2004 |
| JP | 2009-265254 | 11/2009 |

* cited by examiner

*Primary Examiner* — Hoan C Nguyen
(74) *Attorney, Agent, or Firm* — Blakely, Sokoloff, Taylor & Zafman LLP

(57) ABSTRACT

According to one embodiment, a liquid crystal display includes a display module and a backlight module configured to irradiate light on the display module. The backlight module includes a light guide plate, a first light source, a reflective plate, and a second light source. The light guide plate has a light output face at a position corresponding to a first small area on the display module. The first light source is configured to irradiate light toward the light guide plate from a side of the light guide plate in such a manner that the irradiated light reaches the first small area. The reflective plate is facing to the light guide plate, and the reflective plate has a reflective face configured to reflect light toward a second small area different from the first small area. The second light source is configured to irradiate light toward the reflective plate from a side of the reflective plate in such a manner that the irradiated light reaches the second small area.

16 Claims, 7 Drawing Sheets

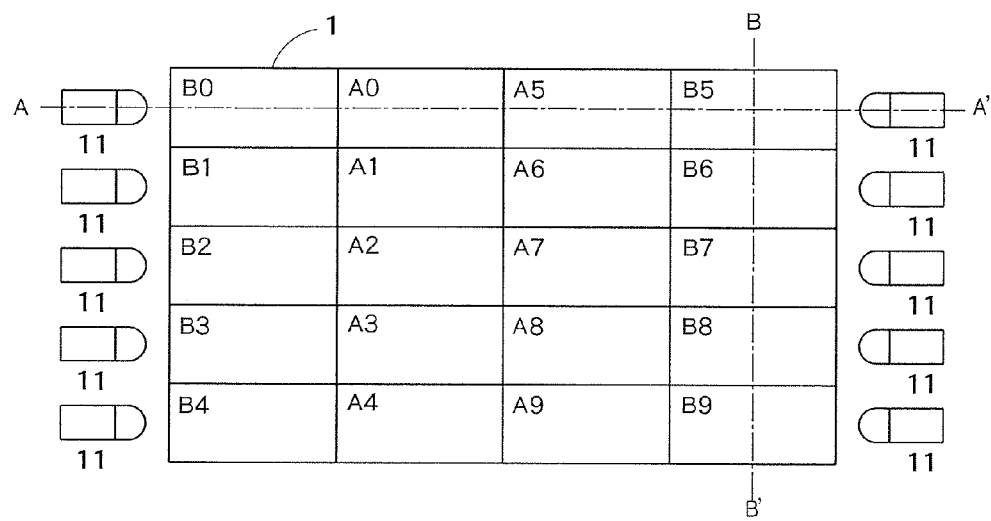
F I G. 2
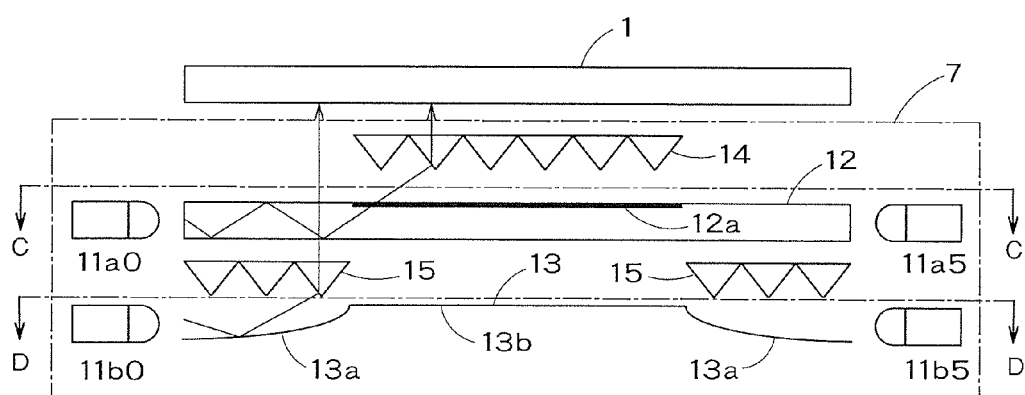
F I G. 3

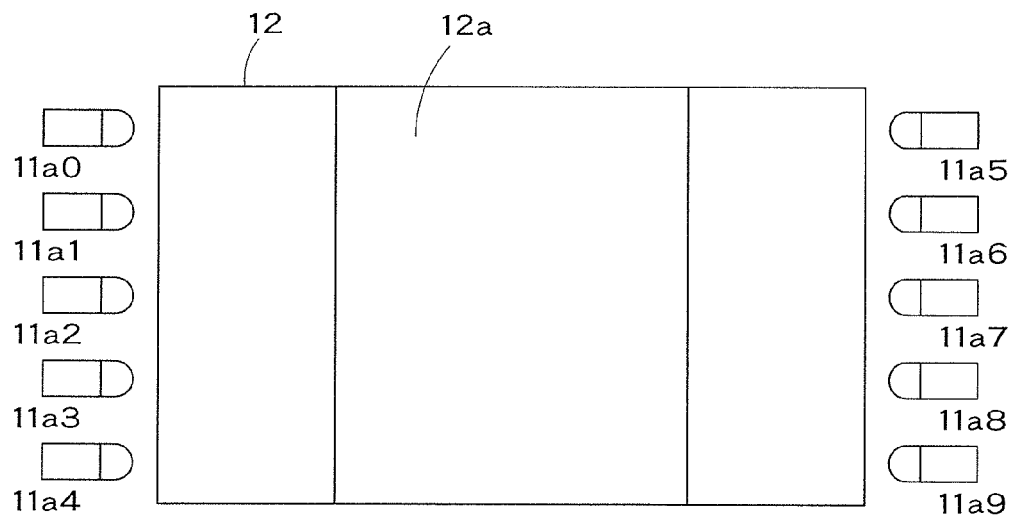
F I G. 4
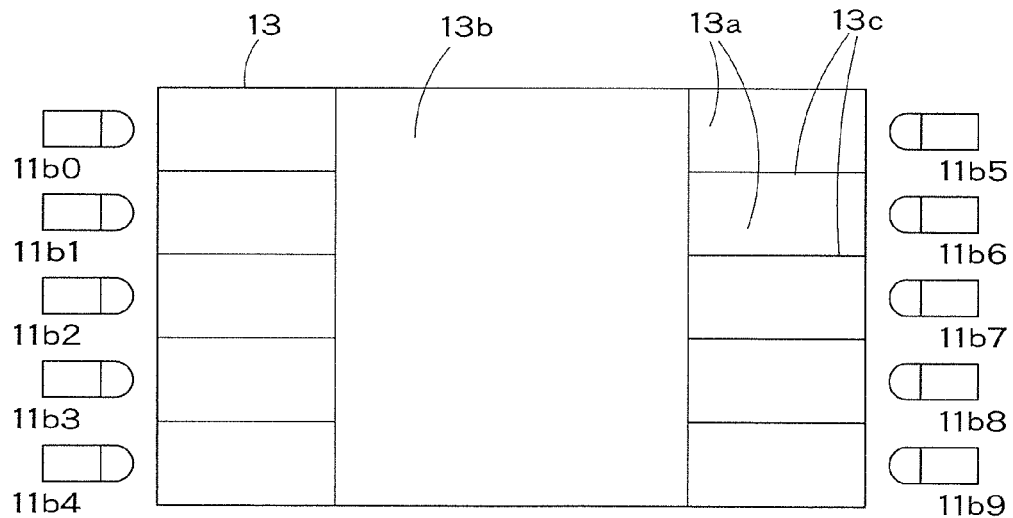
F I G. 5

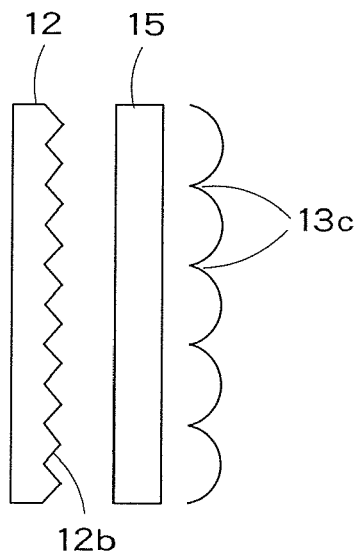
F I G. 6
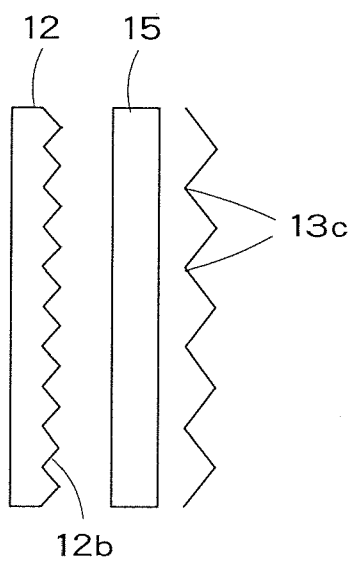 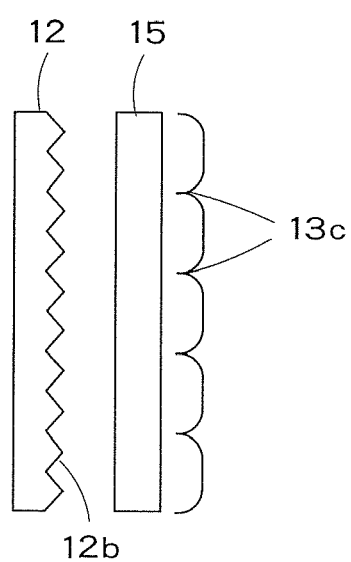
F I G. 7A   F I G. 7B

F I G. 12A
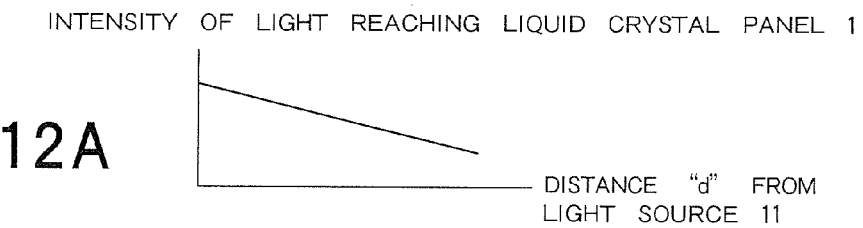
INTENSITY OF LIGHT REACHING LIQUID CRYSTAL PANEL 1
DISTANCE "d" FROM LIGHT SOURCE 11
F I G. 12B
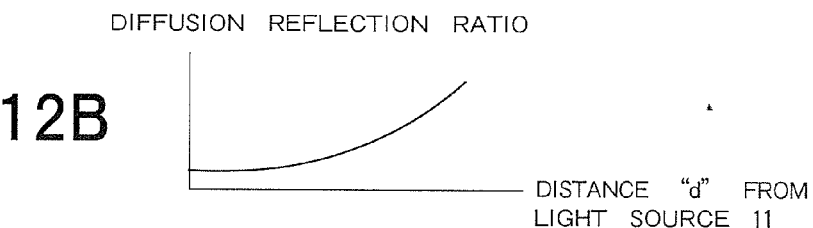
DIFFUSION REFLECTION RATIO
DISTANCE "d" FROM LIGHT SOURCE 11
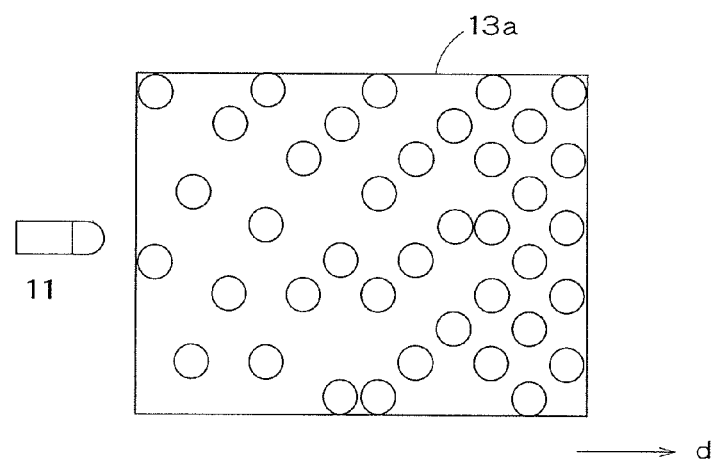
F I G. 13

LIQUID CRYSTAL DISPLAY AND BACKLIGHT MODULE WITH TILTING REFLECTIVE SURFACE

CROSS REFERENCE TO RELATED APPLICATIONS

This application is based upon and claims the benefit of priority from the prior Japanese Patent Application No. 2010-256145, filed on Nov. 16, 2010, the entire contents of which are incorporated herein by reference.

FIELD

Embodiments described herein relate generally to a liquid crystal display and a backlight module.

BACKGROUND

Recently, a liquid crystal display has been widely used. The liquid crystal display has a liquid crystal panel composed by putting liquid crystal materials between a pair of glass substrates and a backlight module for irradiating light on the liquid crystal panel from back side thereof. In order to reduce a manufacturing cost, it is necessary to reduce the cost of not only the liquid crystal panel but also the backlight module.

BRIEF DESCRIPTION OF THE DRAWINGS

FIG. 2 is a diagram showing an example of an arrangement of the liquid crystal panel 1 divided into the plurality of small areas and light sources 11 in the backlight module 7 for irradiating each of the small areas.
FIG. 3 is a sectional view of the horizontal direction of the liquid crystal panel 1 and the backlight module 7.
FIG. 4 is a plane view seen from "C" direction of FIG. 3.
FIG. 5 is a plain view seen from "D" direction of FIG. 3.
FIG. 6 is a sectional view of the vertical direction of the liquid crystal panel 1 and the backlight module 7.
FIGS. 7A and 7B are sectional views of the vertical direction of the backlight module, which are modified examples of FIG. 6.
FIG. 12A is a graph showing a relationship between a distance "d" on the reflective face 13a from the light source and the intensity of the light reaching the liquid crystal panel 1.
FIG. 12B is a graph showing a relationship between the distance "d" on the reflective face 13a from the light source and the diffusion reflection ratio.
FIG. 13 is a plane view of the coated reflective face 13a.

DETAILED DESCRIPTION

In general, according to one embodiment, a liquid crystal display includes a display module and a backlight module configured to irradiate light on the display module. The backlight module includes a light guide plate, a first light source, a reflective plate, and a second light source. The light guide plate has a light output face at a position corresponding to a first small area on the display module. The first light source is configured to irradiate light toward the light guide plate from a side of the light guide plate in such a manner that the irradiated light reaches the first small area. The reflective plate is facing to the light guide plate, and the reflective plate has a reflective face configured to reflect light toward a second small area different from the first small area. The second light source is configured to irradiate light toward the reflective plate from a side of the reflective plate in such a manner that the irradiated light reaches the second small area.

Embodiments will now be explained with reference to the accompanying drawings.

(First Embodiment)

Figure 1:
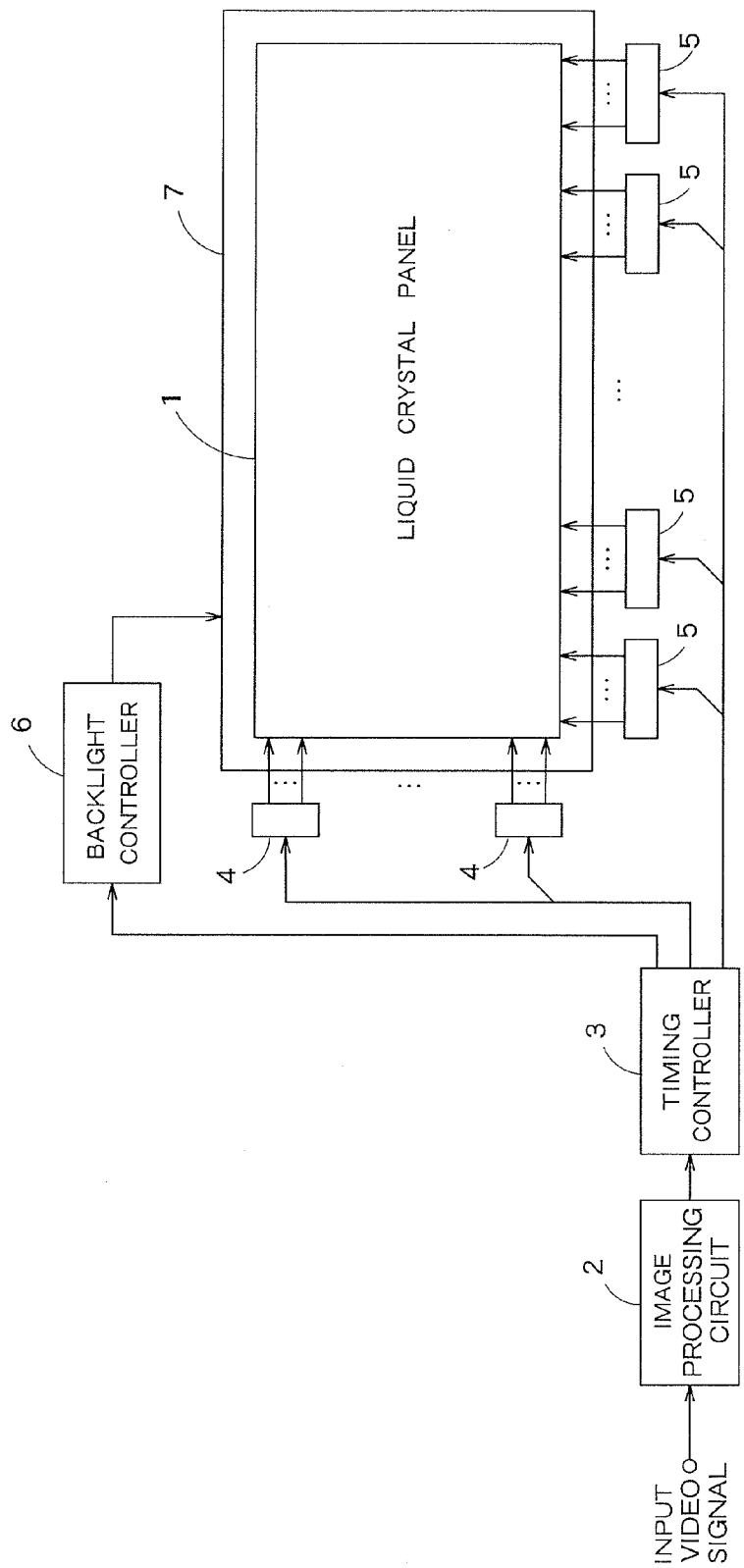
FIG. 1 is a schematic block diagram of a liquid crystal display according to a first embodiment.

FIG. 1 is a schematic block diagram of a liquid crystal display (hereinafter, referred to as LCD) according to a first embodiment. The LCD has a liquid crystal panel (display module) 1, an image processing circuit 2, a timing controller 3, a gate driver 4, a source driver 5, a backlight controller 6, and a backlight module 7.

The liquid crystal panel 1 has a structure where liquid crystal materials are put between a pair of facing glass substrates. The liquid crystal panel 1 has a plurality of (for example, "1080" of) scanning lines, a plurality of (for example, "1920*3" of) signal lines, and a plurality of liquid crystal pixels formed on each of crossing points of the scanning lines and the signal line.

The image processing circuit 2 performs image processing such as decoding processing or processing for high quality image on an input video signal inputted from the outside. The timing controller 3 provides the image-processed input video signal to the source driver 5 and controls the operation timing of the gate driver 4, source driver 5 and backlight controller 6.

The gate driver 4 selects one of the scanning lines by turns. The source driver 5 provides the input video signal to the signal lines of the liquid crystal panel 1. The input video signal is provided to the liquid crystal pixel connected to the scanning line selected by the gate driver 4. According to the voltage of the supplied input video signal, alignments of the liquid crystal materials in the liquid crystal pixel vary. Here, a panel controller has the gate driver 4 and the source driver 5.

On the other hand, the backlight module 7, whose size is substantially the same as that of the liquid crystal panel 1, is arranged behind the liquid crystal panel 1 to irradiate light thereon. Among the irradiated light, light whose intensity depends on the alignments of the liquid crystal materials, is transmissive to the liquid crystal materials to be displayed on the liquid crystal panel 1.

In the present embodiment, the liquid crystal panel 1 is divided into a plurality of small areas. The backlight controller includes an inverter circuit which controls the backlight module 7 so that the high intensity light is irradiated on the small area where the input video signal of high luminance is displayed and the low intensity light is irradiated on the small area where the input video signal of low luminance is displayed, for example. Because of this, contrast ratio of the displayed image improves.

FIG. 2 is a diagram showing an example of an arrangement of the liquid crystal panel 1 divided into the plurality of small areas and light sources 11 in the backlight module 7 for irradiating each of the small areas. In an example of FIG. 2, the liquid crystal panel 1 of FIG. 2 has twenty small areas, that is, four small areas in the column (horizontal) direction and five small areas in the row (vertical) direction. Hereinafter, the small areas A0 to A9 (first small areas) at the central two rows are defined as a first area as a whole, while the small areas B0 to B9 (second small areas) at left and right sides are defined as a second area as a whole. Furthermore, the light sources 11 are arranged at the left side and the right side of the liquid crystal panel 1. Note that, the common reference numeral "11" is attached to all of the light sources in FIG. 2.

FIG. 3 is a sectional view of the horizontal direction of the liquid crystal panel 1 and the backlight module 7 (that is, AA' sectional view of FIG. 2). FIG. 4 is a plane view seen from "C" direction of FIG. 3. FIG. 5 is a plain view seen from "D" direction of FIG. 3. FIG. 6 is a sectional view of the vertical direction of the liquid crystal panel 1 and the backlight module 7 (that is, BB' sectional view of FIG. 2). The backlight module 7 has a plurality of light sources 11, a light guide plate 12, a reflective plate 13, and prism sheets 14 and 15. As shown in FIG. 3, the backlight module 7 has only one light guide plate 12 in this structure.

The light guide plate 12 is, for example, made of acrylic, and a diffusion pattern 12a is formed on the central part corresponding to the first area. Furthermore, as shown in FIG. 6, a prism work 12b is formed on a whole of the back face of the light guide plate 12.

The light sources 11 are, for example, cold cathode fluorescent lamps or LEDs (Light Emitting Diode). One light source can have three kinds of LEDs which emit red, green and blue lights, respectively. Five light sources 11a0 to 11a4 are arranged at the left side of the light guide plate 12 for irradiating the five small areas A0 to A4, respectively, while five light sources 11a5 to 11a9 are arranged at the right side of the light guide plate 12 for irradiating the five small areas A5 to A9, respectively. The lights irradiated by the light sources 11a0 to 11a9 are incident to the light guide plate 12. The intensity of the lights irradiated by the light sources 11a0 to 11a9 and the irradiating timing thereof are controlled by the backlight controller 6 individually.

Note that, a reflective module (not shown) can be arranged around each of the light sources 11a0 to 11a9 so that the reflective module reflects the lights irradiated toward directions different from the light guide plate 12 into the light guide plate 12.

It is preferable that the prism sheet 14 is arranged only above the diffusion pattern 12a between the light guide plate 12 and the liquid crystal panel 1, and not arranged at other places.

When the lights are irradiated by the light sources 11a0 to 11a9 toward the light guide plate 12, the lights are totally reflected in a part where the diffusion pattern 12a is not formed in the light guide plate 12 and the lights are taken out from a part where the diffusion pattern 12a is formed. That is, the part where the diffusion pattern 12a is formed is a light output face. Then, the traveling direction of the lights is set to a direction vertical to the liquid crystal panel 1 by the prism sheet 14, and the lights reach the first area in the liquid crystal panel 1. Note that, although only the prism sheet 14 whose ridge lines are orthogonal to the incident direction of the light source is shown, it is general to arrange prism sheets whose ridge lines are parallel to the incident direction of the light source, and both of prism sheets can be arranged.

Because the prism work 12b is formed whole of the back face of the light guide plate 12, straight proceeding property from the light source is kept by recursive reflection of the light guide plate 12. By controlling the light sources 11a0 to 11a9 individually by the backlight controller 6, the intensity of the lights reaching each of the small areas A0 to A9 in the first area and the irradiating timing can be controlled individually.

On the other hand, as shown in FIG. 3, the reflective plate 13 is arranged under the light guide plate 12 facing to the back face of the light guide plate 12 and has reflective faces 13a corresponding to the second area on the left side and the right side of the reflective plate 13 and has a flat face corresponding to the first area extending from the top of the left and the right reflective faces 13a. Furthermore, as shown in FIGS. 5 and 6, the reflective plate 13 has partitions 13c at positions corresponding to the boundaries between the small areas in the second area. Here, the shape of the vertical section can be a paraboloidal surface, for example. However, it is not necessarily for the shape of the sectional view to be the curved surface shown in FIG. 6. FIGS. 7A and 7B are sectional views of the vertical direction of the backlight module, which are modified examples of FIG. 6. As shown in FIG. 7A, the reflective faces 13a can be "V"-shaped, and as shown in FIG. 7B, the bottom face of the reflective faces 13a can be flat and both sides thereof can be curved. In ether cases, the reflective plate 13 has the partitions 13c.

As shown in FIGS. 3 and 5, five light sources 11b0 to 11b4 are arranged at the left side of the reflective faces 13a and under the light sources 11a0 to 11a4. The light sources 11b0 to 11b4 is arranged in order to irradiate the five small areas B0 to B4, respectively. Furthermore, five light sources 11b5 to 11b9 are arranged at the right side of the reflective faces 13a and under the light sources 11a5 to 11a9. The light sources 11b5 to 11b9 is arranged in order to irradiate the five small areas B5 to B9, respectively. The intensity of the lights irradiated by the light sources 11b0 to 11b9 and the irradiating timing thereof are controlled by the backlight controller 6 individually. Note that, a reflective module (not shown) can be arranged around each of the light sources 11b0 to 11b9.

It is preferable that the prism sheets 15 are arranged only above the reflective faces 13a between the light guide plate 12 and the reflective plate 13, and not arranged at the other places.

When the lights are irradiated by the light sources 11b0 to 11b9 toward the reflective plate 13, the lights proceeds in air above the reflective plate 13 and are reflected by the reflective face 13a toward the liquid crystal panel 1. Then, the traveling direction of the lights is set to the direction orthogonal to the liquid crystal panel 1 by the prism sheets 15, and the lights reach the second area in the liquid crystal panel 1. Because partitions 13c are formed, the intensity of the lights reaching each of the small areas B0 to B9 in the second area and the irradiating timing can be controlled individually by controlling the light sources 11b0 to 11b9 individually by the backlight controller 6.

Note that, it is preferable that the partitions 13c are formed so that a part of light irradiated by one of the light sources 11b0 to 11b9 reaches not only the corresponding one small area in the second area, but also at least one neighboring small area. For example, it is preferable that a part of the light irradiated by the light source 11b2 reaches not only the small area B2 but also the small areas B1 and B3. By such a manner, it is possible to prevent ununiformity from occurring at the boundary between the small areas when two or more neighboring small areas are desired to be irradiated at the same intensity.

Furthermore, although the reflective faces 13a of the reflective plate 13 can be flat, it is preferable that the surface of the reflective face 13a is curved so that the intensity of the light, which is irradiated by each of the light sources 11b0 to 11b9 and is reaching each of the small areal B0 to B9 of the liquid crystal panel 1, becomes uniform.

As stated above, in the first embodiment, the lights are irradiated on the first area of the liquid crystal panel 1 by using the light guide plate 12 and irradiated on the second area by using the reflective plate 13 arranged under the light guide plate 12. Therefore, only one light guide plate 12 is needed.

Furthermore, it is preferable that the prism sheet 14 is arranged only above the diffusion pattern 12*a* and that the prism sheets 15 are arranged above the reflective faces 13*a* of the reflective plate 13. As a result, the backlight module can be implemented by simplified structure, thereby reducing the manufacturing cost of the LCD.

Note that, when there is a space under the flat face 13*b* of the reflective plate 13, the LCD becomes small and thin by arranging at least a part of the image processing circuit 2, the timing controller 3, the gate driver 4, the source driver 5 and the backlight controller 6 of FIG. 1 at the space. Furthermore, it is possible to use a part of a case of the LCD as the reflective plate 13 to reduce the number of parts, thereby further reducing the manufacturing cost.

(Second Embodiment)

In the above described first embodiment, the light sources 11 are arranged at the left side and the right side of the liquid crystal panel 1. On the other hand, in a second embodiment which will be explained below, the light sources 11 are arranged at the under side of the liquid crystal panel 1. Hereinafter, differences from the first embodiment will be mainly explained.

Figure 8:
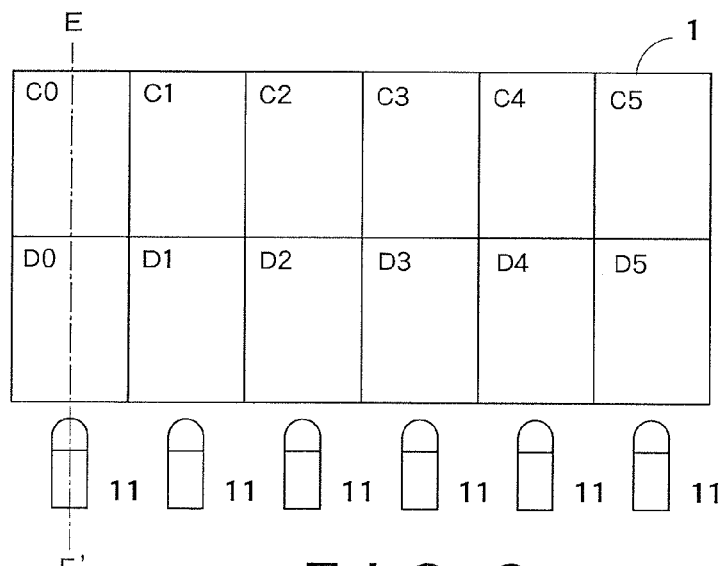
FIG. 8 is a diagram showing another example of an arrangement of the liquid crystal panel 1 divided into the plurality of small areas and light sources 11 in the backlight module 7 for irradiating each of the small areas.

FIG. 8 is a diagram showing another example of an arrangement of the liquid crystal panel 1 divided into the plurality of small areas and light sources 11 in the backlight module 7 for irradiating each of the small areas. The liquid crystal panel 1 of FIG. 8 has twelve small areas, that is, six small areas in the column (horizontal) direction and two small areas in the row (vertical) direction. Hereinafter, the small areas C0 to C5 (first small areas) at the top row are defined as a first area as a whole, while the small areas D0 to D5 (second small areas) at the bottom row are defined as a second area as a whole. As shown in FIG. 8, the light sources 11 are arranged only at the under side of the liquid crystal panel 1.

Figure 9:
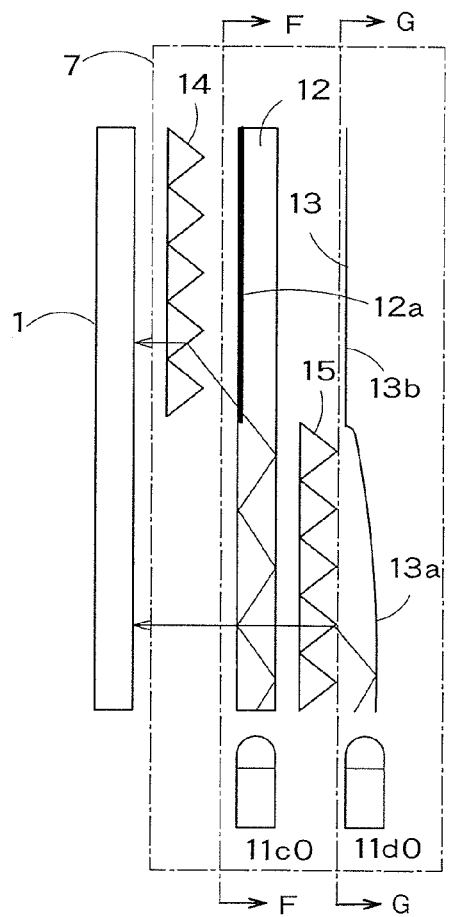
FIG. 9 is a sectional view of the vertical direction of the liquid crystal panel 1 and the backlight module 7.
Figure 10:
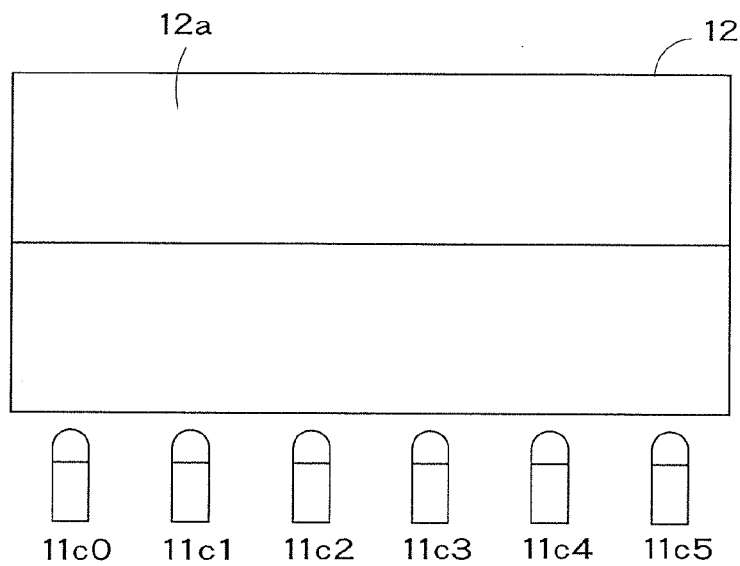
FIG. 10 is a plane view seen from "F" direction of FIG. 9.
Figure 11:
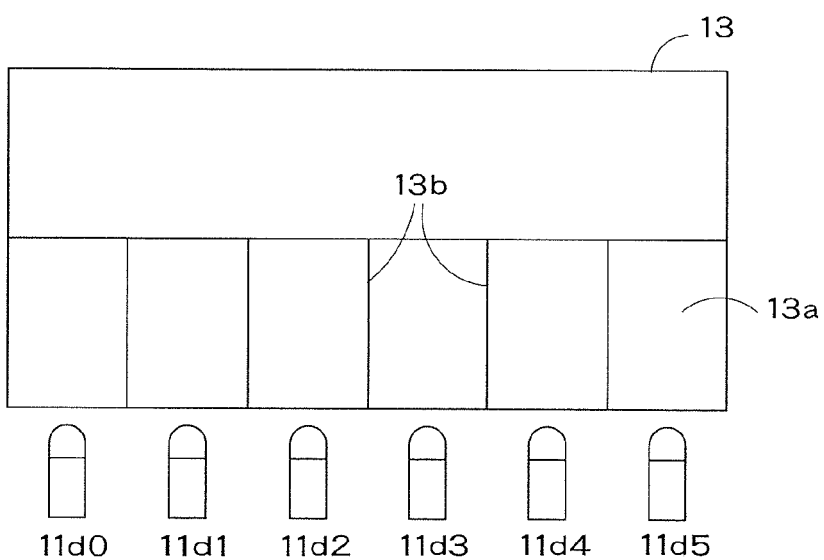
FIG. 11 is a plane view seen from "G" direction of FIG. 9.

FIG. 9 is a sectional view of the vertical direction of the liquid crystal panel 1 and the backlight module 7 (that is, EE' sectional view of FIG. 8). FIG. 10 is a plane view seen from "F" direction of FIG. 9. FIG. 11 is a plane view seen from "G" direction of FIG. 9. As shown in FIGS. 9 and 10, six light sources 11*c*0 to 11*c*5 are arranged at the under side of the light guide plate 12 for irradiating the six small areas C0 to C5, respectively. Furthermore, as shown in FIGS. 9 and 11, six light sources 11*d*0 to 11*d*5 are arranged at the under side of the reflective plate 13 for irradiating the six small areas D0 to D5, respectively. Note that, because a sectional view of the horizontal direction of the backlight module 7 is similar to that shown in FIG. 6, an explanation thereof will be omitted.

The lights irradiated by the light sources 11*c*0 to 11*c*5 are taken out from the diffusion pattern 12*a* of the light guide plate 12 to reach the small areas C0 to C5 through the prism sheet 14, respectively. On the other hand, the lights irradiated by the light sources 11*d*0 to 11*d*5 are reflected by the reflective faces 13*a* of the reflective plate 13 toward the liquid crystal panel 1 to reach the small areas D0 to D5 through the prism sheet 15, respectively. By controlling the light sources 11*c*0 to 11*c*5 and 11*d*0 to 11*d*5 individually by the backlight controller 6, the intensity of the lights reaching each of the small areas C0 to C5 and D0 to D5 and the irradiating timing can be controlled individually.

As stated above, in the second embodiment, light sources 11 are arranged only at the under side of the liquid crystal panel 1. Therefore, the structure of the backlight module becomes further simplified, thereby manufacturing the LCD with small space and low cost.

Note that, the arrangement of the light sources is not limited to FIGS. 2 and 8. For example, the light sources 11 can be arranged at both of the upper side and the under side of the liquid crystal panel 1, or only at the right side or only at the left side. Then, the light guide plate 12 and the reflective plate 13 can be arbitrarily designed in accordance with the arrangement of the light sources 11.

Furthermore, it is enough that the liquid crystal panel 1 is divided into at least one first small area and one second small area. When the liquid crystal panel 1 is divided into a plurality of first small areas and second small areas, the prism work 12*b* is formed whole of the back surface of the light guide plate 12 and the light guide plate 12 has a plurality of light output faces divided by increasing direct proceeding property of the lights, and the reflective plate 13 has a plurality of reflective faces 13*c* divided by the partitions 13*c*. Here, the light output face has the prism work 12*b* and increases the straight proceeding property, and the reflective faces 13*c* are divided by the partitions 13*c*. Contrarily, when the liquid crystal panel 1 is divided in to one first small area and one second small area, the prism work 12*b* and the partition 13*c* are not needed, and one light output face and one reflective face are formed.

(Third Embodiment)

In the above described first and the second embodiments, the intensity of the lights reaching each of the small areas becomes uniform by the shape of the reflective face 13*a* of the reflective plate 13. On the other hand, in a third embodiment which will be described below, the intensity of the lights becomes uniform by coating the reflective faces 13*a*.

When the LCD is thinned, freedom degree of the shape of the reflective face 13*a* becomes small. Therefore, it is not always possible to uniform the intensity of the lights reaching each of the small areas. Accordingly, at least a part of the reflective faces 13*a* is coated whitely, for example. The lights reflected on the coated part are diffused, and the intensity of the lights reflected to the liquid crystal panel 1 becomes large. Hereinafter, a ratio of the intensity of the lights reflected to the liquid crystal panel 1 at a point on the reflective face 13*a* to that irradiated to the point is defined as a diffusion reflection ratio.

FIG. 12A is a graph showing a relationship between a distance "d" on the reflective face 13*a* from the light source and the intensity of the light reaching the liquid crystal panel 1 without coating. As shown in FIG. 12A, as the distance "d" from the light source becomes larger, the intensity of the light reaching the liquid crystal panel 1 generally becomes smaller because the light intensity becomes smaller. Therefore, there may be ununiformity on the liquid crystal panel 1 if no action is performed.

Accordingly, as shown in FIG. 12B, the reflective face 13*a* is coated so that the diffusion reflection ratio becomes larger as the distance "d" from the light source 11 becomes larger. FIG. 13 is a plane view of the coated reflective face 13*a*. By setting a coating density larger as the distance "d" from the light source 11 becomes larger, the diffusion reflection ratio becomes larger as shown in FIG. 12B. Instead, the diffusion reflection ratio can be controlled by changing a kind of coating material, and so on.

By such a manner, although the intensity of the light irradiated by the light source 11 is small at positions where the distance "d" from the light source 11 is large, the diffusion reflection ratio becomes large. As a result, the liquid crystal panel 1 can be irradiated with the uniform light intensity. This manner can be applicable regardless of the arrangement of the light sources 11.

As stated above, in the third embodiment, at least a part of the reflective faces 13*a* of the reflective plate 13 is coated to improve the diffusion reflection ratio. Therefore, even if the freedom degree of the shape of the reflective face 13a is small, the liquid crystal panel 1 can be irradiated with the uniform light intensity.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A liquid crystal display comprising:
   a display module; and
   a backlight module configured to irradiate light on the display module;
   wherein the backlight module comprises:
      a light guide plate comprising a light output face at a position corresponding to a first small area on the display module;
      a first light source configured to irradiate light toward the light guide plate from a side of the light guide plate in such a manner that the irradiated light reaches the first small area;
      a reflective plate facing to the light guide plate, the reflective plate comprising a reflective face configured to reflect light toward a second small area different from the first small area, the reflective face tilting with regard to the light guide plate; and
      a second light source configured to irradiate light toward the reflective plate from a side of the reflective plate so that the irradiated light reaches the reflective face without passing through the light guide plate, and after being reflected, the irradiated light reaches the second small area.

2. The display of claim 1, wherein the backlight module comprises:
   a first prism sheet between the light guide plate and the display module arranged at a first place corresponding to the light output face, the first prism being configured to set a proceeding direction of the light take out from the light output face of the light guide plate toward the display module; and
   a second prism sheet between the light guide plate and the reflective plate arranged at a second place corresponding to the reflective face, the second prism sheet being configured to set a proceeding direction of the light reflected at the reflective face toward the display module.

3. The display of claim 1, wherein at least a part of the reflective face of the reflective plate is coated so that intensity of the light reflected toward the display module becomes large.

4. The display of claim 3, wherein the reflective face of the reflective plate is coated so that the intensity of the light reflected to toward the display module becomes larger as a distance from the second light source becomes larger.

5. The display of claim 1, wherein a shape of the reflective face of the reflective plate is defined in such a manner that intensity of the light reaching the second small area becomes uniform.

6. The display of claim 1, the reflective plate is a part of a case of the display.

7. The display of claim 1 further comprising:
   an image processing circuit configured to perform image processing on an input video signal;
   a panel controller configured to provide the image-processed input video signal to the display module at predetermined timing; and
   a backlight controller configured to control the first and the second light sources of the backlight module,
   wherein the reflective plate comprises a flat face extending from a top of the reflective face, and
   at least a part of the image processing circuit, the panel controller and the backlight controller is arranged under the flat face.

8. A liquid crystal display comprising:
   a display module; and
   a backlight module configured to irradiate light on the display module;
   wherein the backlight module comprises:
      a light guide plate comprising a plurality of light output faces at a plurality of positions each of which corresponds to each of a plurality of first small areas on the display module;
      a plurality of first light sources each of which corresponds to each of the first small areas, each of the first light sources being configured to irradiate light toward the light guide plate from a side of the light guide plate in such a manner that the irradiated light reaches each of the first small areas;
      a reflective plate facing to the light guide plate, the reflective plate comprising a plurality of reflective faces each of which is configured to reflect light toward each of a plurality of second small areas different from the first small areas, the reflective face tilting with regard to the light guide plate; and
      a plurality of second light sources each of which corresponds to each of the second small areas, each of the second light sources is configured to irradiate light toward the reflective plate from a side of the reflective plate so that the irradiated light reaches the reflective face without padding through the light guide plate, and after reflection, the irradiated light reaches each of the second small areas.

9. The display of claim 8, wherein a part of the light irradiated by one of the second light sources reaches corresponding one of the second small areas and at least another one of the second small areas neighboring the corresponding one of the second small areas.

10. The display of claim 8, wherein the backlight module comprises:
    a first prism sheet between the light guide plate and the display module arranged at a first place corresponding to the light output face, the first prism being configured to set a proceeding direction of the light take out from the light output face of the light guide plate toward the display module; and
    a second prism sheet between the light guide plate and the reflective plate arranged at a second place corresponding to the reflective face, the second prism sheet being configured to set a proceeding direction of the light reflected at the reflective face toward the display module.

11. The display of claim 8, wherein at least a part of the reflective face of the reflective plate is coated so that intensity of the light reflected toward the display module becomes large.

12. The display of claim 11, wherein the reflective face of the reflective plate is coated so that the intensity of the light reflected to toward the display module becomes larger as a distance from the second light source becomes larger.

13. The display of claim 8, wherein a shape of the reflective face of the reflective plate is defined in such a manner that intensity of the light reaching the second small area becomes uniform.

14. The display of claim 8, the reflective plate is a part of a case of the display.

15. The display of claim 8 further comprising:

an image processing circuit configured to perform image processing on an input video signal;

a panel controller configured to provide the image-processed input video signal to the display module at predetermined timing; and a backlight controller configured to control the first and the second light sources of the backlight module, wherein the reflective plate comprises a flat face extending from a top of the reflective face, and at least a part of the image processing circuit, the panel controller and the backlight controller is arranged under the flat face.

16. A backlight module comprising:

a light guide plate comprising a light output face at a predetermined position;

a first light source configured to irradiate light toward the light guide plate from a side of the light guide plate, the first light source corresponding to the light output face;

a reflective plate comprising a reflective face configured to reflect light toward a predetermined direction, the reflective face tilting with regard to the light guide plate; and a second light source configured to irradiate light toward the reflective plate from a side of the reflective plate, the second light source corresponding to the reflective face, the irradiated light reaching the reflective face without passing through the light guide plate.

* * * * *